United States Patent [19]
Maekawa et al.

[11] Patent Number: 5,929,544
[45] Date of Patent: *Jul. 27, 1999

[54] DRAINAGE STRUCTURE OF FAN MOTOR

[75] Inventors: Hirohiko Maekawa, Gunma-ken; Masaei Sato, Ashikaga, both of Japan

[73] Assignee: Mitsuba Corporation, Kiryu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/762,057

[22] Filed: Dec. 9, 1996

[30] Foreign Application Priority Data

Jun. 14, 1995 [JP] Japan ................................... 7-171376

[51] Int. Cl.[6] ........................................................ H02K 5/00
[52] U.S. Cl. ............................... 310/88; 310/89; 310/62; 310/63
[58] Field of Search ..................... 310/88, 89, 62, 310/63; 417/423.7, 423.14; 416/169 A, 189; 123/41.49, 41.7, 198 E; 62/272, 285; 165/122

[56] References Cited

U.S. PATENT DOCUMENTS

| 4,829,208 | 5/1989 | Uchino | 310/268 |
| 4,893,039 | 1/1990 | Isii | 310/89 |
| 4,930,659 | 6/1990 | Sauber | 220/367 |
| 4,945,270 | 7/1990 | Okamoto | 310/88 |
| 5,010,265 | 4/1991 | Tanaka et al. | 310/88 |
| 5,071,322 | 12/1991 | Maekawa | 417/423.7 |
| 5,268,606 | 12/1993 | Adam et al. | 310/88 |
| 5,336,954 | 8/1994 | Shiroyama | 310/88 |

FOREIGN PATENT DOCUMENTS

| 1-101145 U | 7/1989 | Japan . |
| Y2-6-15478 | 4/1994 | Japan . |

*Primary Examiner*—Nestor Ramirez
*Assistant Examiner*—K. Imayoshi E. Tamai
*Attorney, Agent, or Firm*—Oliff & Berridge, PLC

[57] ABSTRACT

A drain structure for a fan motor prevents water from entering a discharge hole in the casing of the fan motor. A guiding passage is in opposed relation to the discharge hole and includes a front end portion covered by a fan boss section and an outer rib to prevent water from entering through the discharge hole into the casing. The guiding passage receives water discharged from the discharge hole. The discharge hole is formed in a lower portion of a casing cylindrical section. The casing cylindrical section is mounted on a fitting bracket for securement to a radiator.

19 Claims, 5 Drawing Sheets

DRAINAGE STRUCTURE OF FAN MOTOR

BACKGROUND OF THE INVENTION

1. Field of the Invention

The invention relates to a drain structure for a fan motor that cools radiators and other similar devices.

2. Description of Related Art

In general, in a fan motor, a discharge hole is made in a lower portion of the fan motor casing to discharge water introduced into the motor. A drain cover is fitted around the discharge hole to guide the discharged water, as exemplified by Japanese Examined Utility Model Publication No. 6-15478. In such a fan motor, there is a need to prevent water from flowing in a reverse direction due to a cooling air current passing through the drain cover, which occurs due to the rotation of the fan. However, in such devices, water tends to stay in the drain cover and results in difficulty in discharge. In order to eliminate this problem, there is a need to form a particular guiding way, which complicates the structure.

SUMMARY OF THE INVENTION

It is therefore an object of the invention to provide a drain structure for a fan motor which is capable of eliminating the above stated problems.

It is a further object of the invention to provide a device which covers the front and rear sides of a drain cover.

For this purpose, there is provided a fan motor in which a fan boss section is fixedly secured to a motor shaft protruding from a fan motor casing. A guiding passage is formed adjacent an outer surface of the casing to guide water discharged through a discharge hole made in a lower portion of the casing toward at least the fan boss section side. A cylindrical rib protrudes from the fan boss section and covers a forward surface of the casing. The cylindrical rib extends to cover a portion of the guiding passage adjacent the fan boss section.

With this structure, the portion of the guide passage adjacent the fan boss section is covered with the fan boss section and the rib, so that the aforementioned problem is prevented without the need for a particular covering structure.

BRIEF DESCRIPTION OF THE DRAWINGS

These and other aspects and advantages of the invention will become apparent from the following detailed description of preferred embodiments, when taken in conjunction with the accompanying drawings in which.

DETAILED DESCRIPTION OF THE PREFERRED EMBODIMENT

Figure 1:
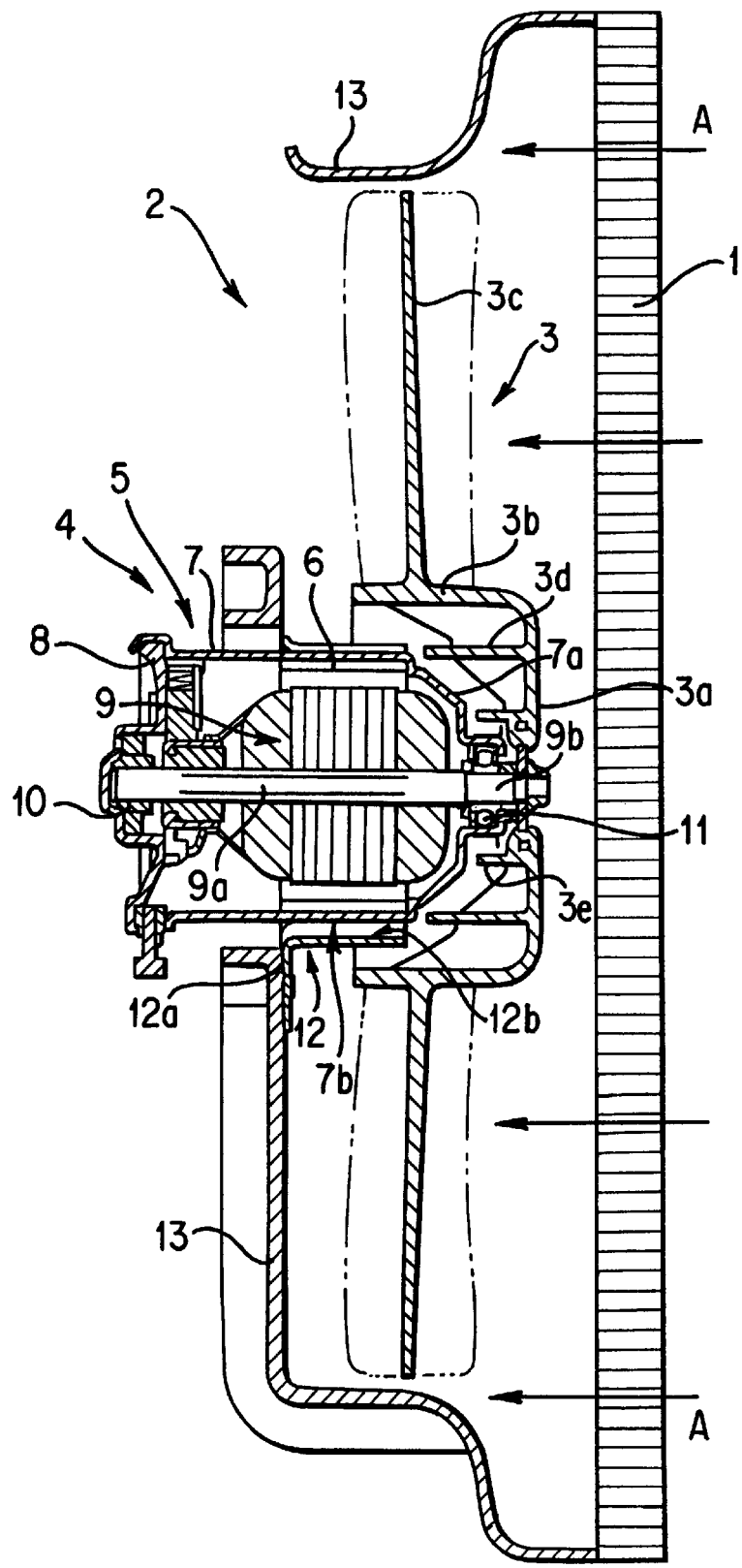
FIG. 1 is a side cross-sectional view of a fan apparatus according to a first embodiment of the invention.
Figure 2:
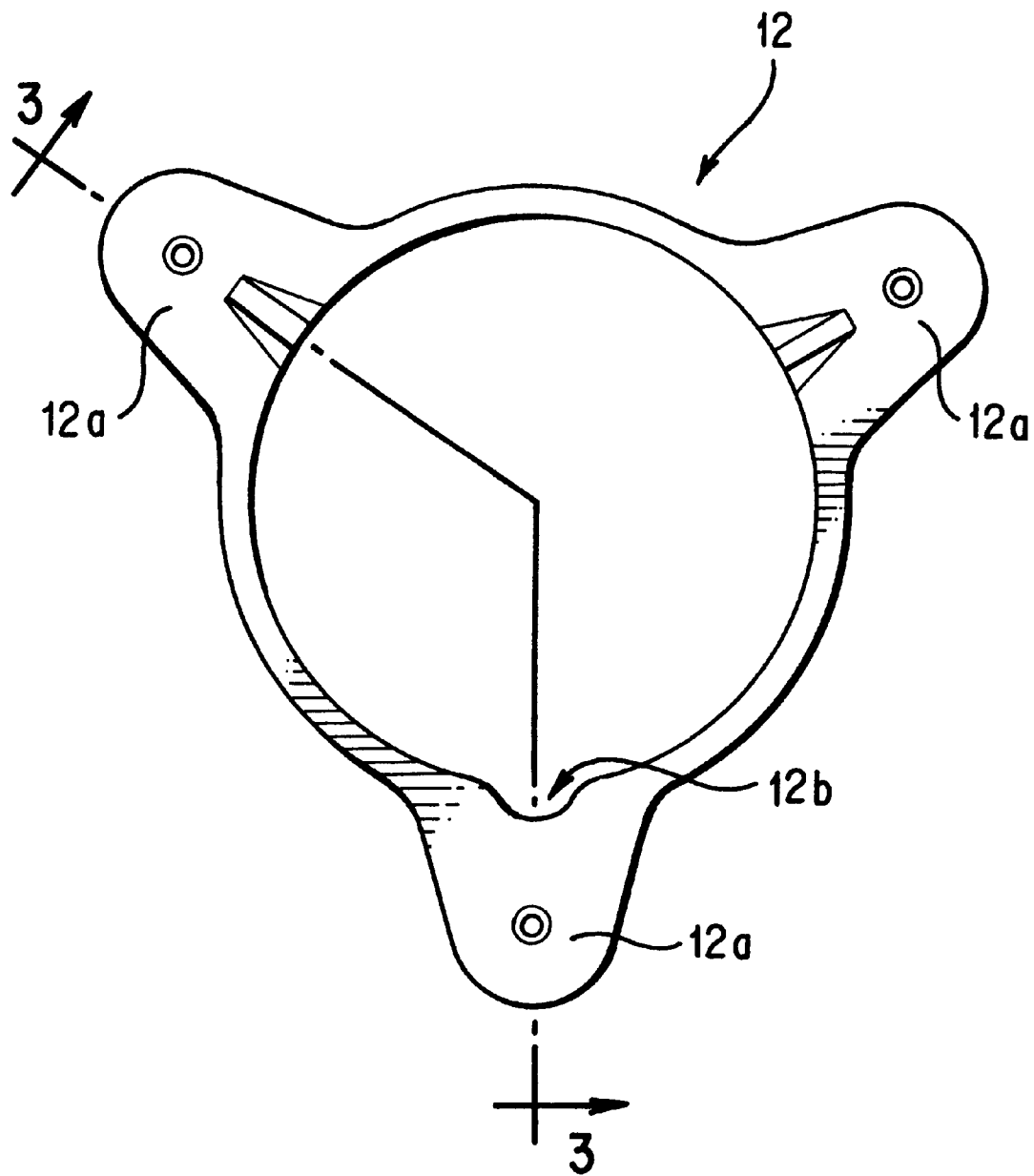
FIG. 2 is a front view of a cylindrical fitting bracket according to the first embodiment of the invention.
Figure 3:
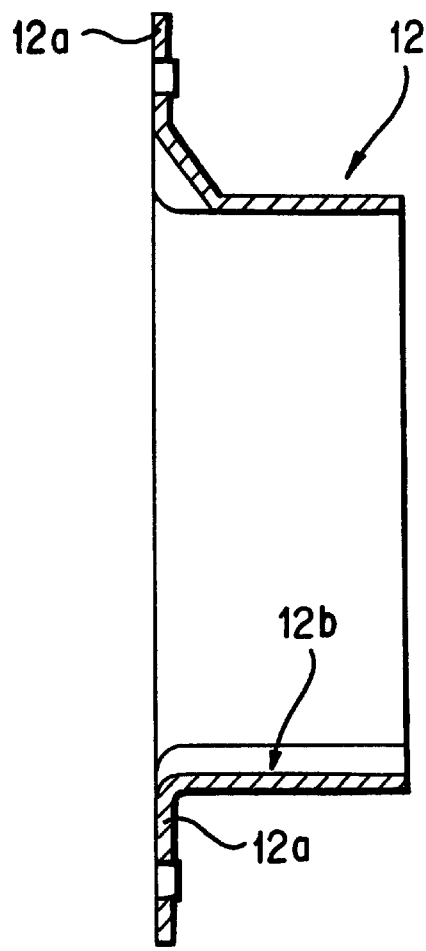
FIG. 3 is a cross-sectional view taken along a line 3—3 of FIG. 2.
Figure 4:
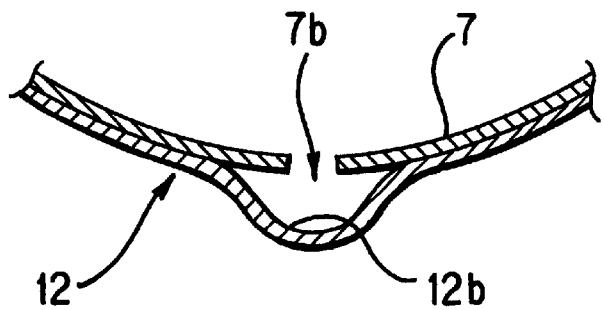
FIG. 4 is an enlarged front elevational cross-sectional view showing the cylindrical fitting bracket and casing cylindrical section according to the first embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

FIGS. 1 to 4 are diagrams showing a first embodiment of the invention. A radiator 1 for mounting on a motor vehicle such as a car is shown. The radiator 1 cools the engine cooling water. Radiator 1 is cooled by an electric fan apparatus 2 placed at the back of radiator 1. The electric fan apparatus 2 includes a fan 3 and a fan motor 4 for rotating the fan 3. Rotation of the fan 3 creates a cooling air current that flows in a direction as indicated by arrows A to blow against the radiator 1.

A casing 5 constitutes a portion of the fan motor 4. Casing 5 is made up of a casing cylindrical section 7 equipped with a fixed permanent magnet 6 on its inner circumferential surface to establish a yoke, and an end bracket 8 detachably fitted to cover an open end portion of the casing cylindrical section 7. A rotary shaft 9a of a rotor 9 is located within the casing 5 and is rotatably supported by bearings 10, 11. Bearings 10, 11 are supported by the end bracket 8 and a front portion 7a of the cylindrical section 7. A rotary shaft tip portion 9b of the rotary shaft 9a penetrates the front portion 7a and is integrally and fixedly secured to a fan boss section 3a acting as a portion of the fan 3.

A drainage structure member in a form of a cylindrical fitting bracket 12 is fitted over an outer circumferential surface of the casing cylindrical section 7. At a rear section of the fitting bracket 12, there are three fitting pieces 12a bent and formed to protrude radially and outwardly. The fitting pieces 12a are fixedly screwed to a shroud 13 integrally provided on the back side of the radiator 1 so that the fan motor 4 is fixedly situated at the back of the radiator 1.

A discharge hole 7b is made in a lower portion of the cylindrical section 7 to allow discharge of water within the casing 5. In the first embodiment, the discharge hole 7b is positioned in a substantially central portion of the fitting bracket 12. At a lower portion of the fitting bracket 12 there is formed a guiding passage or channel 12b. Guiding passage 12b is recessed and extends in the forward and backward directions. The guiding passage 12b is positioned to be in opposed relation to the discharge hole 7b of the cylindrical section 7 so that water discharged from the discharge hole 7b is guided through the guiding passage 12b and exits the fan apparatus.

On the fan boss section 3a that fixedly accepts the rotary shaft tip portion 9b, there is an integrally formed outer cylindrical rib 3b. Outer cylindrical rib 3b projects from an outer circumferential edge portion of the fan boss section 3a backwardly and covers the front side outer circumferential surface of the casing cylindrical section 7. Further, the projecting rear end portion of the outer cylindrical rib 3b extends to substantially cover the front half section of the cylindrical fitting bracket 12. Still further, a blade 3c of the fan 3 is integrally formed on the outer cylindrical rib 3b to radially and outwardly protrude from the cylindrical outer circumferential surface of the outer cylindrical rib 3b so that the blade 3c extends to overlap with the front end portion of the guiding passage 12b and generates the resulting flowing air current. In the first embodiment, the guiding passage 12b is located adjacent the fitting pieces 12a of the cylindrical fitting bracket 12. Accordingly, the entering of water from the rear side of the guiding passage 12b is avoided due to the shroud 13 fixedly secured to the fitting pieces 12a.

Inner cylindrical ribs 3d, 3e are radially positioned side by side and protrude backwardly from the rear surface of the fan boss section 3a. The rear end portions of inner ribs 3d, 3e are positioned to be in close and opposed relation to the front portion 7a of casing cylindrical section 7, thus further preventing passage of water into the interior of boss section 3a.

According to the first embodiment of the invention, the actuation of the fan motor 4 results in rotation of the fan 3 and provides cooling air current as shown by arrows A through the operation of the blade 3c to cool the radiator 1. During such operation, water coming into the casing 5 is discharged through the discharge hole 7b and the guiding passage 12b and exits the electric fan apparatus.

As described above, according to the invention, water within the casing 5 can be discharged from the fan apparatus due to the positioning of the discharge hole 7b and the guiding passage 12b. The outer side of the discharge hole 7b is covered with guiding passage 12b, and the front half section of the guiding passage 12b is positioned on an upstream side of the cooling air current. A forward side of the front half section of the guiding passage 12b is closed by the fan boss section 3a and the outer rib 3b. As a result, while the rearward side of the guiding passage 12b is directly exposed to the cooling air current due to the fan 3, the cooling air is prevented from blowing through the guide passage 12b. As a result, the entrance of water into the casing 5 due to the cooling air current blowing therethrough is prevented. In addition, since the blade 3c overlaps the front half section of the guiding passage 12b, the introduction of the cooling air current into the front end portion of the guide passage 12b due to the rotation of the blade 3c is prevented, thereby further reducing the entrance of water into the casing 5.

Figure 5:
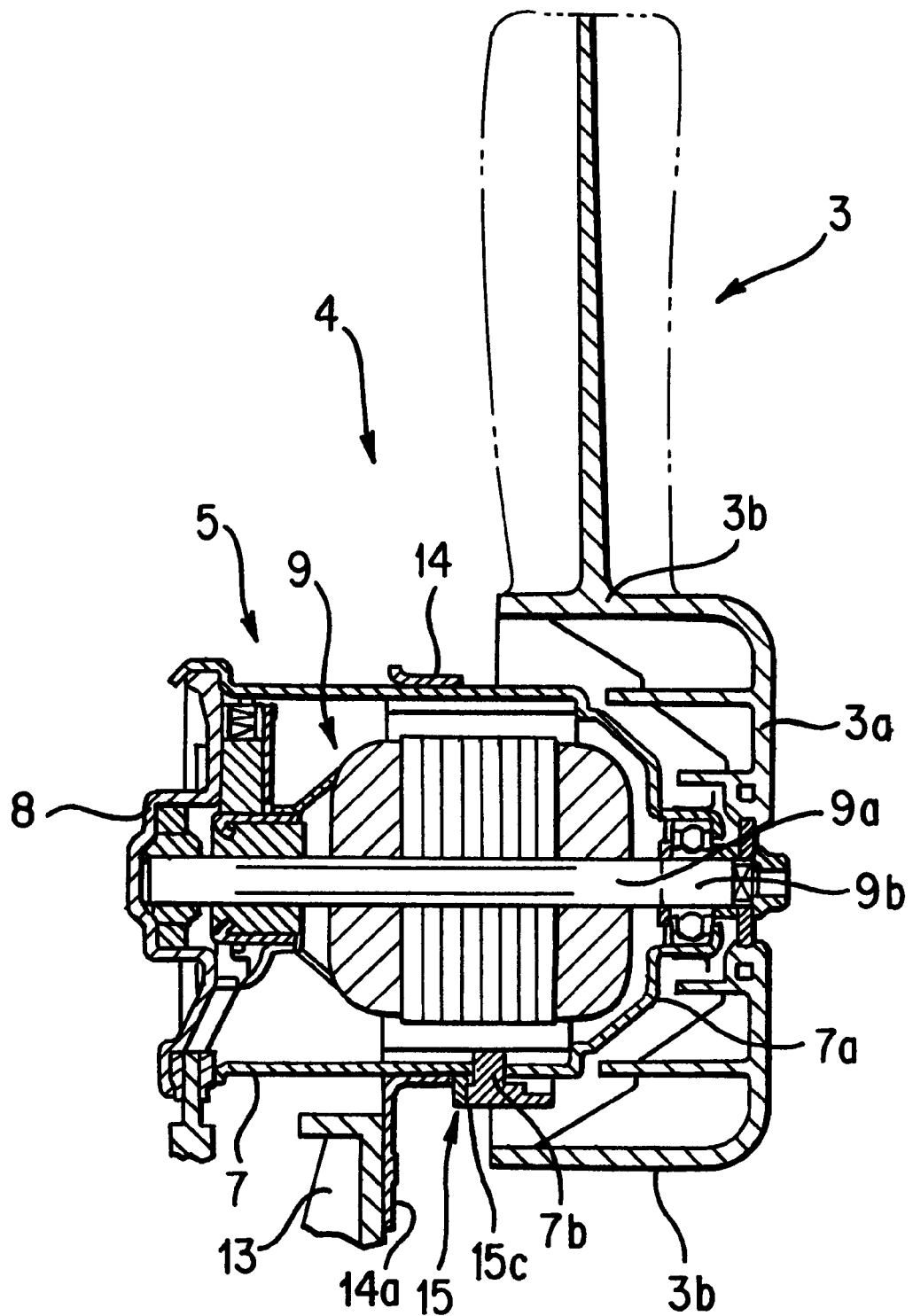
FIG. 5 is a side cross-sectional view of a fan apparatus according to the second embodiment of the invention.
Figure 6A:
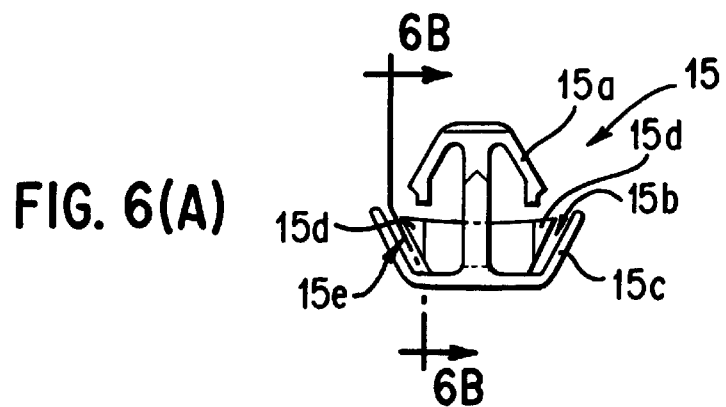
FIG. 6A is a front view of a drain cover according to the second embodiment of the invention.
Figure 6B:
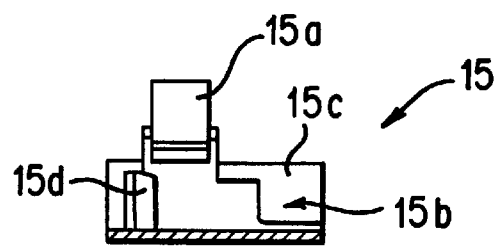
FIG. 6B is a cross-sectional view taken along a line 6B—6B of FIG. 6A.
Figure 6C:
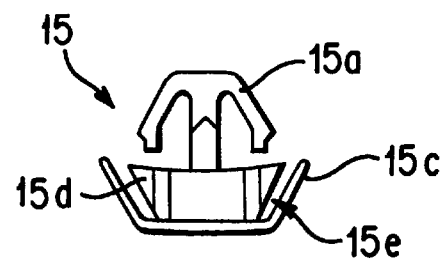
FIG. 6C is a rear view of the drain cover according to the second embodiment of the invention.
Figure 6D:
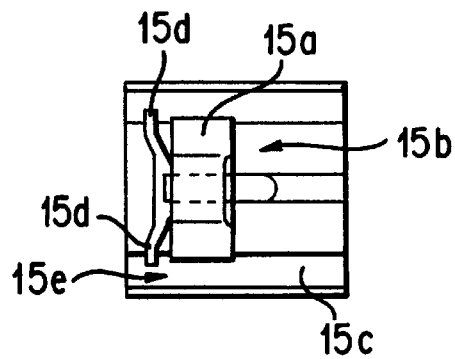
FIG. 6D is a plan view of the drain cover according to the second embodiment of the invention.

The invention is not limited to the above-described first embodiment, but includes a second embodiment where the guiding passage and the fitting bracket are provided separately, as shown in FIGS. 5 and 6A–6B, rather than being integrally formed. In the second embodiment, a fitting bracket 14 is provided with a smaller width so as to not extend to the position of the discharge hole 7b of the cylindrical section 7. A drain cover 15 is fitted into the discharge hole 7b and is fixedly positioned to be adjacent to and in front of the fitting bracket 14.

The drain cover 15 as shown in FIGS. 6A to 6D includes a fitting section 15a made to forcibly engage with the discharge hole 7b. A conduit section 15c formed at a lower end portion of the fitting section 15a receives water from the discharge hole 7b and defines a guiding passage 15b. A wall plate section 15d is formed at the rear end portion of the conduit section 15c.

As shown in FIG. 5 outer rib 3b extends over the front end portion of the conduit section 15c. That is, it extends over the portion of the conduit section 15c adjacent the fan boss section, and covers it. With this structure, the forward portion of the guiding passage 15b is free from being exposed to the cooling air current, with the result that the entering of water into the casing due to the cooling air current blowing through is prevented.

Additionally, the wall plate section 15d is formed at the rear end portion of the guiding passage 15b to further prevent the entering of water into the guiding passage 15b from its rear end portion side, resulting in further improved water-proof performance. In the second embodiment, a gap 15e is defined between the wall plate section 15d and the conduit section 15c to allow possible water discharge therefrom. However, the gap can be eliminated to prevent the possibility of water entering the cylindrical section 7. When the gap is eliminated, it is possible to completely prevent water from entering the rear end side of the guiding passage 15b.

Thus, according to the preferred embodiments of the invention, a fan motor is provided wherein water introduced into the fan motor casing is discharged from a discharge hole through a guiding passage to the outside. Since the rear side of the discharge hole is covered by a guiding passage, and a forward portion of the guiding passage and an outer opening thereof are covered by the fan boss section and the rib, cooling air current from the fan is prevented from blowing through the guiding passage. Such arrangement results in avoiding water entering into the casing due to the cooling air current.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A drain structure for a fan motor in which an impermeable fan boss section is fixedly secured to a motor shaft protruding from a casing, the fan motor operative to generate a cooling air current, said drain structure comprising:

a discharge hole formed in a lower portion of said casing;

a drain structure member disposed on said casing and defining a guiding passage to guide water discharged through said discharge hole toward at least said impermeable fan boss section; and a cylindrical rib provided in said impermeable fan boss section that protrudes to define a cylindrical chamber, the cylindrical rib protruding, so as to surround at least an outer surface portion of said casing and at least an end portion of said drain structure member, said outer surface portion and said end portion being disposed toward said impermeable fan boss section and projecting into the cylindrical chamber thereby preventing the cooling air current carrying water from entering the casing through the guiding passage.

2. A drain structure for a fan motor as defined in claim 1, wherein said rib is formed as an outer circumferential portion of said fan boss section.

3. A drain structure for a fan motor as defined in claim 1, further comprising a blade placed to overlap with the end portion of said drain structure member on an upstream side of the cooling air current.

4. A drain structure for a fan motor as defined in claim 2, further comprising a blade placed to overlap with the end portion of said drain structure member on an upstream side of the cooling air current.

5. A drain structure for a fan motor in which an impermeable fan boss section is fixedly secured to a motor shaft protruding from a casing, the fan motor operative to generate a cooling air current, said drain structure comprising:

discharge hole means for discharging water and formed in a lower portion of said casing;

guiding passage means for guiding water through said discharge hole means toward at least said impermeable fan boss section, said guiding passage means being disposed on an outer surface of said casing and defining a guiding passage; and cylindrical rib means defining a cylindrical chamber by protruding to surround at least an outer surface portion of said casing and at least an end portion of said guiding passage means, said outer surface portion and said end portion disposed toward said impermeable fan boss section and projecting into the cylindrical chamber thereby preventing the cooling air current carrying water from entering the casing through the guiding passage.

6. A drain structure for a fan motor as defined in claim 5, wherein said cylindrical rib means is formed as an outer circumferential portion of said fan boss section.

7. A drain structure for a fan motor as defined in claim 5, further comprising blade means placed to overlap with the end portion of said guiding passage means on an upstream side of the cooling air current.

8. A drain structure for a fan motor as defined in claim 6, further comprising blade means placed to overlap with the end portion of said guiding passage means on an upstream side of the cooling air current.

9. A drain structure assembly, comprising:

a motor assembly comprising a motor shaft and a cylindrical casing section, said cylindrical casing section including a discharge hole formed into a lower portion thereof;

an impermeable fan boss section mounted on said motor shaft and operative for generating a cooling air current, said fan boss section including an outer cylindrical rib extending toward said cylindrical casing section to form a cylindrical chamber; and a drain structure member mounted adjacent said discharge hole, said drain structure member defining a guiding passage to guide water discharged through said discharge hole toward said fan boss section, wherein said outer cylindrical rib extends rearwardly to surround an outer front surface of said cylindrical casing section and at least a front portion of said drain structure member, wherein the outer front surface of said cylindrical casing section and the front portion of said drain structure member project into the cylindrical chamber thereby preventing the cooling air current carving water from entering the cylindrical casing section through the guiding passage.

10. The drain structure assembly according to claim 9, wherein said drain structure member is positioned under said discharge hole with said guiding passage extending parallel to said motor shaft.

11. The drain structure assembly according to claim 9, further comprising a cylindrical fitting bracket for supporting said motor assembly, wherein said drain structure member is integrally formed with said fitting bracket.

12. The drain structure assembly according to claim 9, wherein said guiding passage is a channel.

13. The drain structure assembly according to claim 9, wherein said drain structure member comprises a fitting section, said fitting section fixedly secured in said discharge hole and supporting a conduit section defining said guiding passage.

14. The drain structure assembly according to claim 13, further comprising a wall plate section extending across a rear portion of said guiding passage.

15. The drain structure assembly according to claim 9, wherein said outer cylindrical rib is formed as an outer circumferential portion of said fan boss section, and further comprising fan blades extending from an outer surface of said cylindrical rib.

16. The drain structure assembly according to claim 15, wherein said fan blades overlap a front portion of said guiding passage.

17. The drain structure assembly according to claim 16, further comprising at least one inner cylindrical rib extending from said fan boss section toward said cylindrical casing section, said at least one inner cylindrical rib extending adjacent a front portion of said cylindrical casing section.

18. The drain structure assembly according to claim 9, further comprising at least one inner cylindrical rib extending from said fan boss section toward said cylindrical casing section, said at least one inner cylindrical rib extending adjacent a front portion of said cylindrical casing section.

19. The drain structure assembly according to claim 18, wherein said at least one inner cylindrical rib comprises two inner cylindrical ribs, each of said inner cylindrical ribs extending adjacent the front portion of said cylindrical casing section.

* * * * *